United States Patent
Thebault et al.

(10) Patent No.: US 7,229,042 B2
(45) Date of Patent: Jun. 12, 2007

(54) PACKAGING REEL WITH AN OPTICAL FIBER UNWINDING DEVICE

(75) Inventors: Fabrice Thebault, Ploubezre (FR); Jean-Louis Desaunay, Saint Quay Perros (FR); Jean-Pierre Louboutin, Trebeurden (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 10/537,233

(22) PCT Filed: Nov. 25, 2003

(86) PCT No.: PCT/FR03/03494

§ 371 (c)(1),
(2), (4) Date: May 31, 2005

(87) PCT Pub. No.: WO2004/063786

PCT Pub. Date: Jul. 29, 2004

(65) Prior Publication Data
US 2006/0049294 A1    Mar. 9, 2006

(30) Foreign Application Priority Data

Dec. 13, 2002  (FR) .................................. 02 15957

(51) Int. Cl.
*B65H 75/38* (2006.01)
(52) U.S. Cl. ................. 242/388.1; 242/388.5
(58) Field of Classification Search ................ 242/378, 242/378.1, 388, 388.1, 388.2, 388.5, 388.6, 242/603, 602, 602.2; 191/12.2 R, 12.4, 12.2 A; 385/135, 137

See application file for complete search history.

(56) References Cited

U.S. PATENT DOCUMENTS

| | | | | |
|---|---|---|---|---|
| 3,208,121 A | * | 9/1965 | Price | 242/388.1 |
| 4,489,902 A | * | 12/1984 | Chaconas et al. | 242/388.1 |
| 4,553,715 A | | 11/1985 | Roselli | |
| 5,109,983 A | | 5/1992 | Malone et al. | |
| 5,265,822 A | * | 11/1993 | Shober et al. | 242/388.2 |
| 5,746,389 A | | 5/1998 | Willmann | |
| 6,269,213 B1 | | 7/2001 | Ohta et al. | |
| 6,315,598 B1 | | 11/2001 | Elliot et al. | |
| 6,484,958 B1 | | 11/2002 | Xue et al. | |
| 6,511,009 B1 | * | 1/2003 | Harrison et al. | 242/388.5 |
| 2002/0153445 A1 | * | 10/2002 | Ichinari et al. | 242/388.1 |
| 2002/0176682 A1 | | 11/2002 | Gatica | |

FOREIGN PATENT DOCUMENTS

| | | |
|---|---|---|
| DE | 297 19 323 U | 2/1998 |
| FR | 2 748 576 A | 11/1997 |
| FR | 2 814 246 A | 3/2002 |

* cited by examiner

*Primary Examiner*—William A. Rivera
(74) *Attorney, Agent, or Firm*—Cohen Pontani; Lieberman & Pavane LLC

(57) ABSTRACT

A cable packaging and unwinding device. The device enables the exact length of cable necessary for connecting two connection points to be unwound easily and quickly and a residual surplus length of cable to be stowed in a protected area, to prevent the cable from being subjected to any twisting or crushing and to obtain a reliable connection between the two connection points.

12 Claims, 5 Drawing Sheets

PACKAGING REEL WITH AN OPTICAL FIBER UNWINDING DEVICE

RELATED APPLICATIONS

This is a U.S. National Phase Application under 35 USC 371 of International Application PCT/FR2003/003494, filed on 25 Nov. 2003.

FIELD OF THE INVENTION

The present invention relates to a cable packaging and unwinding device.

The field of the invention is that of cables and more particularly that of packaging and unwinding cables. It finds a typical application in setting up a connection between two connection points in terminal portions of optical fiber cable networks, for example between a connection box and an optical point that is situated in a dwelling or between an optical point and a user terminal, both of which are situated within a dwelling. Another application is to setting up connections in central offices between network equipments and optical fiber cables of the network. Note that the remainder of the description describes only the application to optical fiber cables, because a device of this kind has the advantage of facilitating the introduction of these cables into domestic installations. However, it must be clearly understood that the invention is not limited to this type of cable and may be applied more generally to packaging and unwinding any type of filamentary member.

BACKGROUND OF THE INVENTION

The various stages of laying the terminal portions of a cable network are still executed conventionally, and largely through manual operations. Connection operations to connect two points a few meters or a few tens of meters apart by means of optical fiber cables are still executed on-site and consist in cutting the cable to the correct length and then preparing the ends of the cable, or of the optical fibers of a cable, with a view to connecting the cable or the fibers by means of connectors or splices. To allow for reworking and repairs, those connection operations necessitate a length of cable that is slightly greater than the distance between the two points to be connected. That surplus length is coiled up by hand and stowed in a corner on completion of the connection operations, leading to risks of kinking, stretching, crushing and failing to comply with the specified radii or curvature of the cable, leading subsequently to transmission problems. Moreover, those connection operations are sometimes made difficult by the conditions under which they have to be carried out, which makes the results somewhat hit and miss and further reduces the reliability of the connections. As a result, the cost of those works represents a relatively large proportion of the total connection cost.

Some network installers have sought to use a cable fitted with a connector and known as a "jumper" cable. In this case, a jumper cable is used that is longer than the distance between the points to be connected, and it is necessary to stow the surplus length of cable.

For unwinding lengths of cable, it is known in the art to use devices consisting of a spool or a drum that has two winding volumes, in order to provide access to and to allow unwinding of both ends of a cable. The cable is wound and unwound manually, with all the attendant risks of stretching and kinking. What is more, the cables are not protected at the periphery of the spool, where they are accessible. Those devices are bulky and generally intended for temporary installations, but are not suited for discreet and permanent stowage of a residual length of cable, for example over several years, either in a dwelling or outdoors.

U.S. Pat. No. 5,109,983 describes a device for stowing a surplus length of an optical fiber cable fitted with a connector at each end. The device takes the form of a flexible support having two chiral circular halves that have holes at their circumference through which the cable and the connector are passed, the flexible support being slightly twisted to enlarge the holes. The fact that the device is divided into two halves enables two continuous sections of the cable to be unwound independently. However, because it necessitates an entirely manual operation consisting in passing the end of the cable to be unwound together with its connector through a larger or smaller number of holes, that device does not provide for packaging and unwinding a cable easily and quickly. Manual operation of the device generates a risk of kinking and twisting the cable which is liable to lead to subsequent transmission problems. That device is therefore not ergonomic and is not suited to easy and fast winding and unwinding of cable.

French Patent application no. 2 814 246 describes a device for packaging a surplus length of cable that includes a stowage support consisting of a flange surmounted by two stowage areas defined by two concentric cylinders which communicate with each other via openings in their walls. Two sections of the surplus length of cable that are continuous with each other are coiled or wound onto each of two concentric cylinders defining the two stowage areas. The ends of the cable and the connectors are stowed inside the internal cylinder. That device can absorb surplus lengths of jumper cable of a few meters. However, the winding operations are still manual, which implies, in that situation also, risks of kinking, stretching, and twisting the cable. Moreover, that device is not adapted to unwinding exactly the required length, since unwinding is manual, and so a residual surplus length at most equal to the diameter of the external cylinder cannot be stowed correctly and is therefore exposed to the risk of kinking, crushing, etc. Also, the cable is not completely protected, which makes that stowage device difficult to use outdoors and makes it necessary to place it in a protected place.

SUMMARY OF THE INVENTION

One object of the present invention is to provide a cable packaging and unwinding device comprising a spool in which there are formed two winding areas for two continuous sections of a cable and a stowage area for the ends of the cable sections, enabling the exact length of cable necessary for connecting two connection points to be unwound easily and quickly and a residual surplus length of cable to be stowed in a protected area, to prevent the cable from being subjected to any twisting or crushing and to obtain a reliable connection between the two connection points.

One aspect of the present invention is directed to a cable packaging and unwinding device comprising a spool in which are formed two winding areas for two continuous sections of a cable and at least one stowage area for at least one end of one of the two cable sections. In this device, the spool takes the form of a drum having two lateral flanges and an interior flange, such interior flange defining the two winding areas and including an opening forming a passage for the cable between the two winding areas. The two lateral flanges have a notch forming a passage for each cable section from the stowage area to the exterior of the spool, and the spool is mounted to rotate about an axis (A) inside a substantially cylindrical casing in which are formed openings forming a passage for each cable section.

Thus, since the spool is rotatably mounted, either section of the cable can be unwound without any manipulation of the cable, which eliminates all risk of kinking or twisting. The device also enables the cable sections to be unwound independently of each other and the exact length needed to connect two points can be unwound with the surplus lengths stored in the spool disposed inside the casing, which protects the cable and prevents it from being subjected to any twisting or crushing.

DETAILED DESCRIPTION OF THE DRAWINGS

Figure 1:
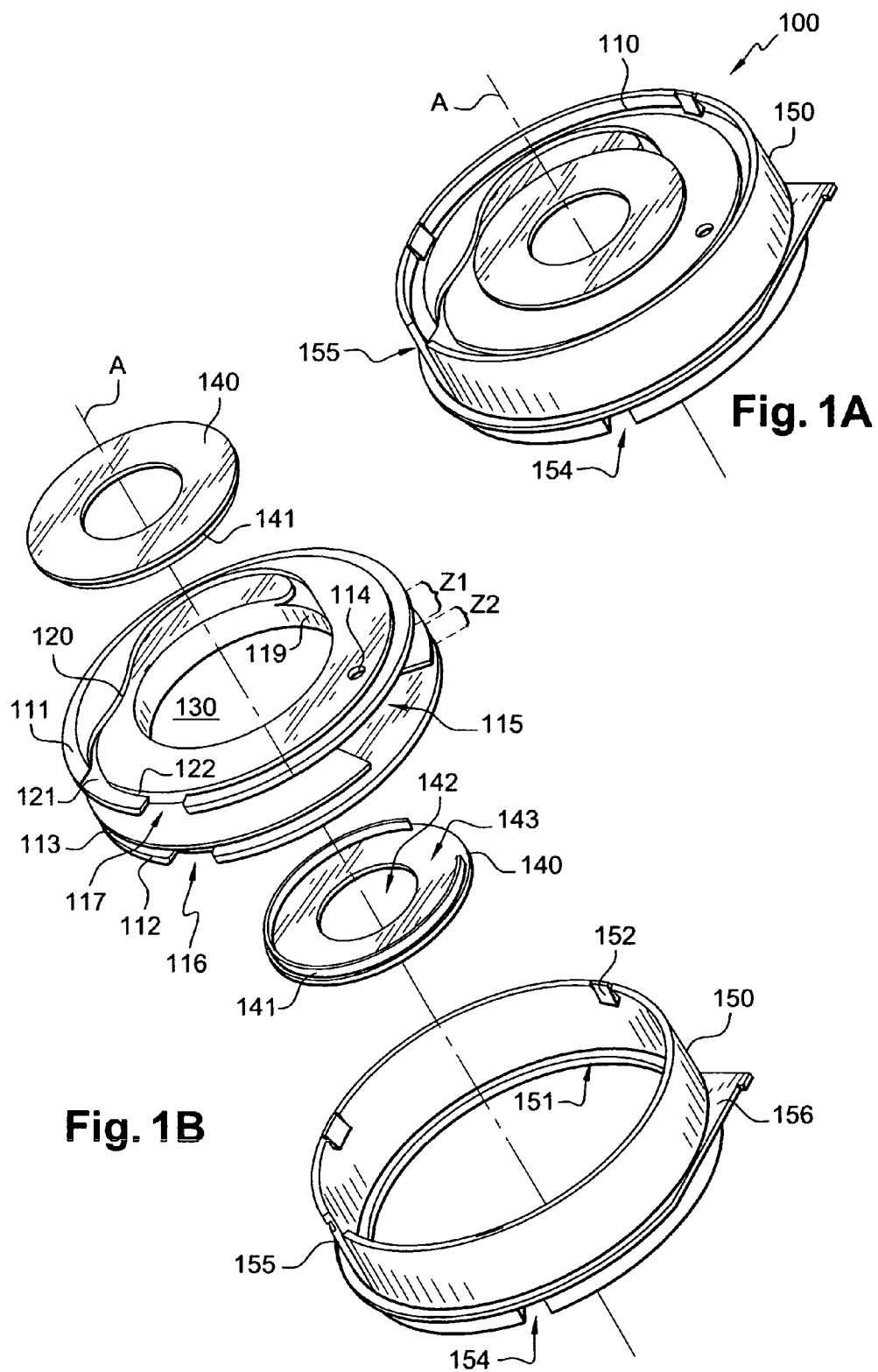
FIG. 1A is a diagram of a first embodiment of a cable packaging and unwinding device.
FIG. 1B is an exploded perspective view of the FIG. 1A device.

FIG. 1A is a perspective view of a first embodiment of a cable packaging and unwinding device 100 which includes a spool 110 inside a substantially cylindrical casing 150. The spool 110 is mounted in the casing 150 so that it can rotate freely about an axis A. The casing 150 includes openings 154 and 155 through which two continuous cable sections can pass. The expression "two continuous cable sections" means two cable portions each terminating in one end of the cable.

FIG. 1B is an exploded perspective view of the FIG. 1A device and shows the structure of this kind of device more clearly, enabling it to be explained better.

The device comprises a spool 110, a casing 150 and two covers 140. The spool 110 is formed of a hollow drum 119 defined at its ends by two lateral flanges 111, 112. An interior flange 113 divides the volume between the two lateral flanges into two winding areas Z1, Z2 which communicate with each other via an opening 115 which allows the cable to pass from one winding area to the other whilst maintaining a radius of curvature that is suitable for the cable. In the case of an optical fiber cable, the radius of curvature must not be less than 25 millimeters (mm) for a signal to be transmitted correctly.

A cable is wound in the factory into each winding area Z1, Z2. The length of cable stowed in this way in each of the areas Z1 and Z2 is defined by their total volume and by the position of the interior flange 113. This position is such that a few meters are stowed in the area Z1 and a few tens of meters are stowed in the other area Z2, for example.

Respective notches 116, 117 are formed at the periphery of the lateral flanges 112, 111 to enable two cable sections to be passed out of the casing from a stowage area 130. A notch is provided in each of the lateral flanges. In the embodiment shown in FIG. 1B, the interior of the drum 119 constitutes the stowage area 130 for both cable ends, the connectors, and/or the splices.

The notches 116, 117 communicate with a groove 120 that is formed in the thickness of each lateral flange 111, 112 and guides a cable section from the periphery of the lateral flange 111 to the stowage area 130 and retains the cable section end in the stowage area during rotation of the spool.

The groove 120 has an entry 121 of angular or conical shape, for example, to maintain a radius of curvature that is suitable for the cable, and a rim 122 which consists of an increased thickness of the material of the flange equal to the depth of the groove and slightly greater than the diameter of the cable, in order to prevent the cable coming into contact with external elements, such as the casing 150 or the covers 140, which could lead to crushing of the cable when winding it or unwinding it.

Moreover, the groove 120 can take the form of a series of curves and counter-curves, for example an S-shape, to hold the cable better. The groove 120 can further have rough faces so as to hold the cable better through friction.

The two covers 140 are identical and their function is to close the openings in the drum 119 to protect the connectors or the splices that are stowed therein and to hold the residual surplus length of cable coiled inside the device. The covers are retained by a wall 141 at the periphery of the cover which nests inside the internal cylinder of the drum 119 and has a discontinuity 143 intended to be placed over the entry of the cable into the groove 120, so as to prevent crushing of the cable. An opening 142 facilitates removal of the cover by means of a hook or a finger, for example. Of course, the covers may take other forms. One variant consists in providing a cover with an articulated flap for closing the opening 142. Another variant consists in providing covers without openings that nest over the cylindrical exterior walls of the casing 150.

There is also a recess 114 in each lateral flange 111, 112. The shape of this recess is of no importance provided that it is able to receive a fitting adapted to serve as a handle for rotating the spool 110.

Figure 2:
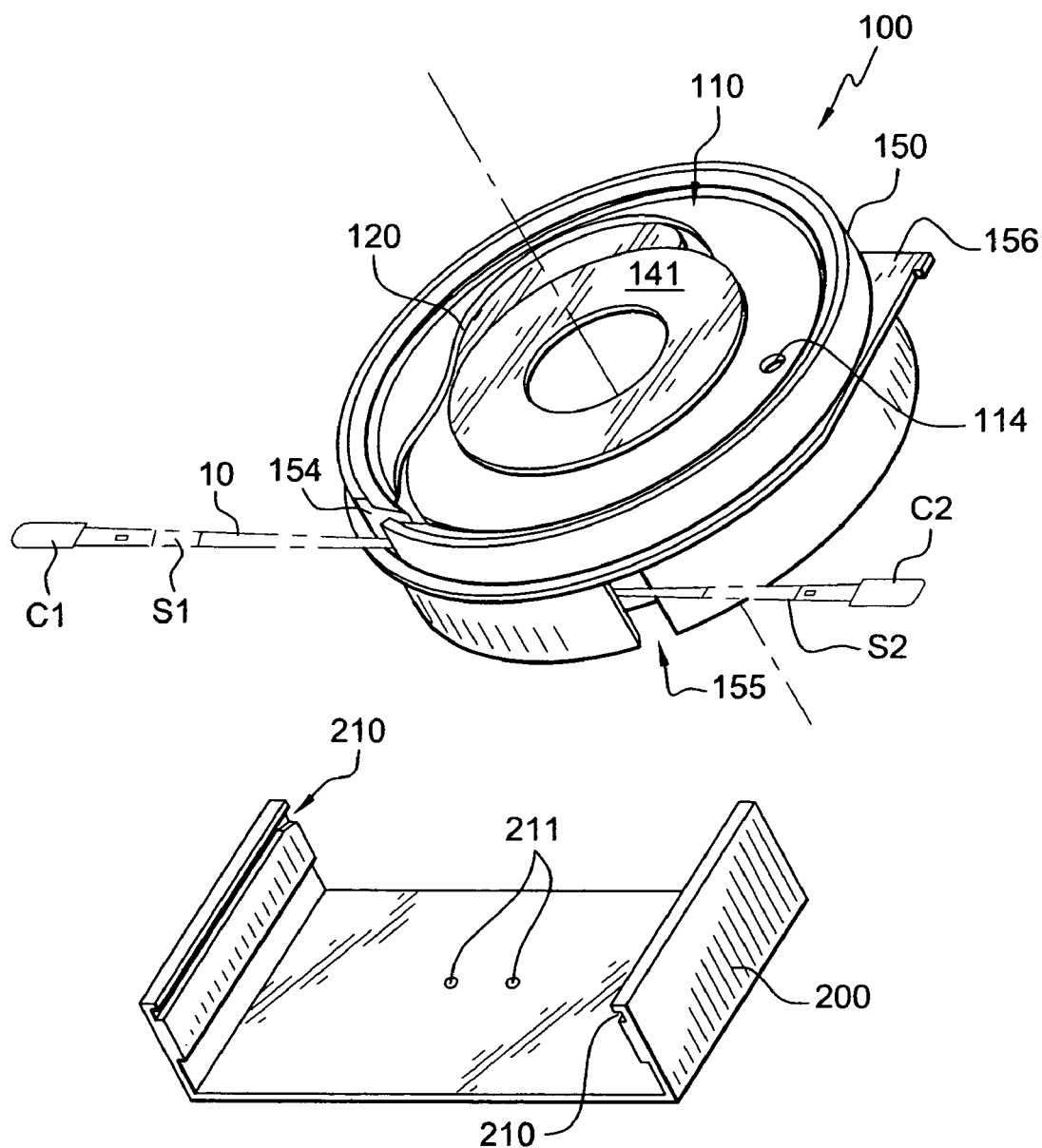
FIG. 2 is a diagram of the FIG. 1A device containing an optical fiber cable and a support for the device.

FIG. 2 shows this second embodiment of the device into which a cable 10 is wound. In this figure, the ends of two continuous cable sections S1, S2, each fitted with a connector C1, C2, have been taken out of their stowage area and are ready to be pulled gently to unwind them. To enable these cable sections S1, S2 to be extracted from the casing 150, it is necessary to line up the notches in the lateral flanges with respective associated openings 154, 155 in the casing 150 by rotating the spool 110.

When the two cable sections S1, S2 have been extracted, rotating the spool one way, for example clockwise in FIG. 2, unwinds a first cable section S1 and winds on the other cable section S2, whereas rotating the spool in the opposite direction, i.e. counter-clockwise in FIG. 2, winds in the first cable section S1 and unwinds the second cable section S2.

A rib 156 at the outside edge of the casing 150 guides and locates the casing in a support 200. The support 200 is U-shaped, for example, its two sides having a groove 211 in which the rib 156 on the casing 150 can slide. In this case the support 200 may be substituted for one of the covers 140. Orifices 211 are formed in the back of the support 200 for fastening it to a wall, for example to a baseboard. Alternatively, the support 200 may be integrated into a user terminal, by direct molding during fabrication of the terminal or by sticking it thereto.

Figure 3A:
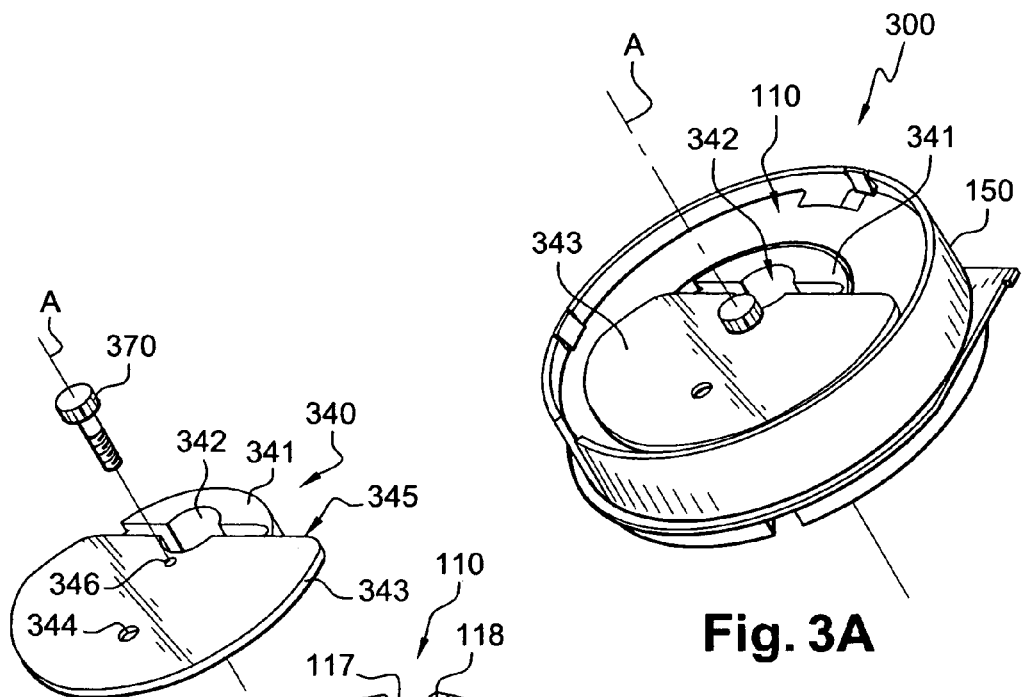
FIG. 3A is a diagram of a second embodiment of a cable packaging and unwinding device.
Figure 3B:
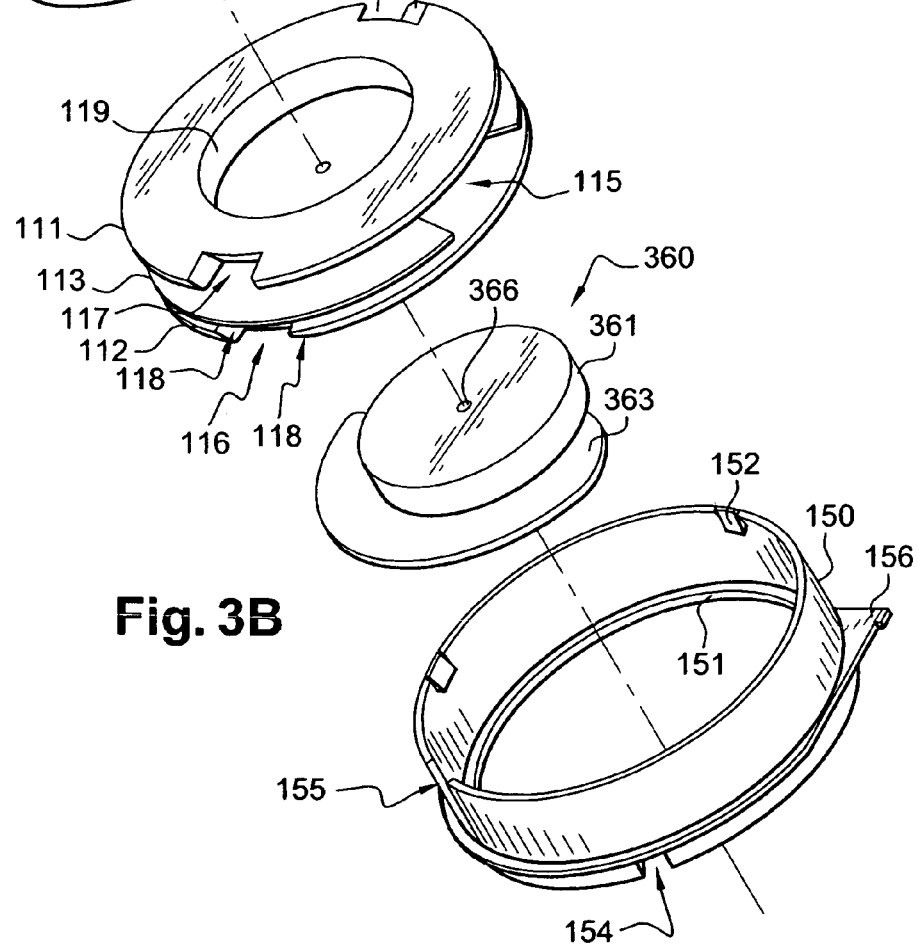
FIG. 3B is an exploded perspective view of the FIG. 3A device.

FIGS. 3A and 3B are respectively a perspective view and an exploded perspective view of a second embodiment of a device 300 for packaging and unwinding cable or any type of filamentary member. In these figures, the same reference numbers are used to designate the same items as in FIGS. 1A and 1B. This device also includes a spool 110 retained in a casing 150 in such a manner that it can rotate freely about an axis A.

The notches 116, 117 in the lateral flanges 112, 111 include inclined flats 118 to comply with constraints in respect of the radius of curvature of the cable when it is being unwound or wound on. These inclined flats are not shown on the device from FIGS. 1A and 1B, but they may also constitute an advantageous feature of the first embodiment.

In this second embodiment, it is essentially the stowage areas for the ends of the cable, whether fitted with connectors or not, that are different.

Two stowage areas 340, 360 are preferably disposed head-to-tail inside the drum 119 of the spool 110 for storing respective ends of the cable with an associated connector. These stowage areas are rotatable about the axis A.

Only the stowage area 340 is described hereinafter, since the other stowage area 360 is completely identical to it. It includes a cylindrical support 341 adapted to be housed in the drum 119 of the spool. A stowage cavity 342 in the support 341 accommodates one end of the cable and its connector. A guiding cam 343 and retaining means 370 are fixed to the support 341. A recess 344 in the thickness of the cam 343 receives an appropriate fitting adapted to serve as a handle for driving the guiding cam 343 and the cylindrical support 341 in rotation about the axis A.

The guiding cam 343 preferably has a thickness at least equal to the diameter of the cable, to prevent the cable from jamming when it is being unwound or wound in. It also has a lateral wall 345 inclined at a minimum angle of 15° to prevent the end of a cable section escaping unintentionally from the stowage cavity 342.

In FIG. 3B, the stowage area retaining means comprise a screw 370, for example. In this embodiment, the cam 343, 363 and the cylindrical support 341, 361 of each stowage area 340, 360 have a central hole 346, 366 passing through the rotation axis A and adapted to receive the screw 370. The hole in the first stowage area is smooth, for example, whereas the hole in the other area is threaded. In this case, when the screw is tightened, it fastens the two stowage areas 340, 360 together with the spool 110 sandwiched between them. The mobile cams 343, 363 are therefore fastened to the spool 110 or not according to whether the screw 370 is respectively tighter or looser.

Accordingly, when the screw is tightened, a surplus length of cable may be retained in the device, the connectors are stowed in the stowage cavities, and the spool 110 is rotated with the two cams.

With the screw slightly loosened, the stowage areas 340, 360 can rotate about the axis A independently of each other. This enables a surplus length of cable to be drawn in again on unwinding a first cable section and without affecting the other cable section.

Figure 4:
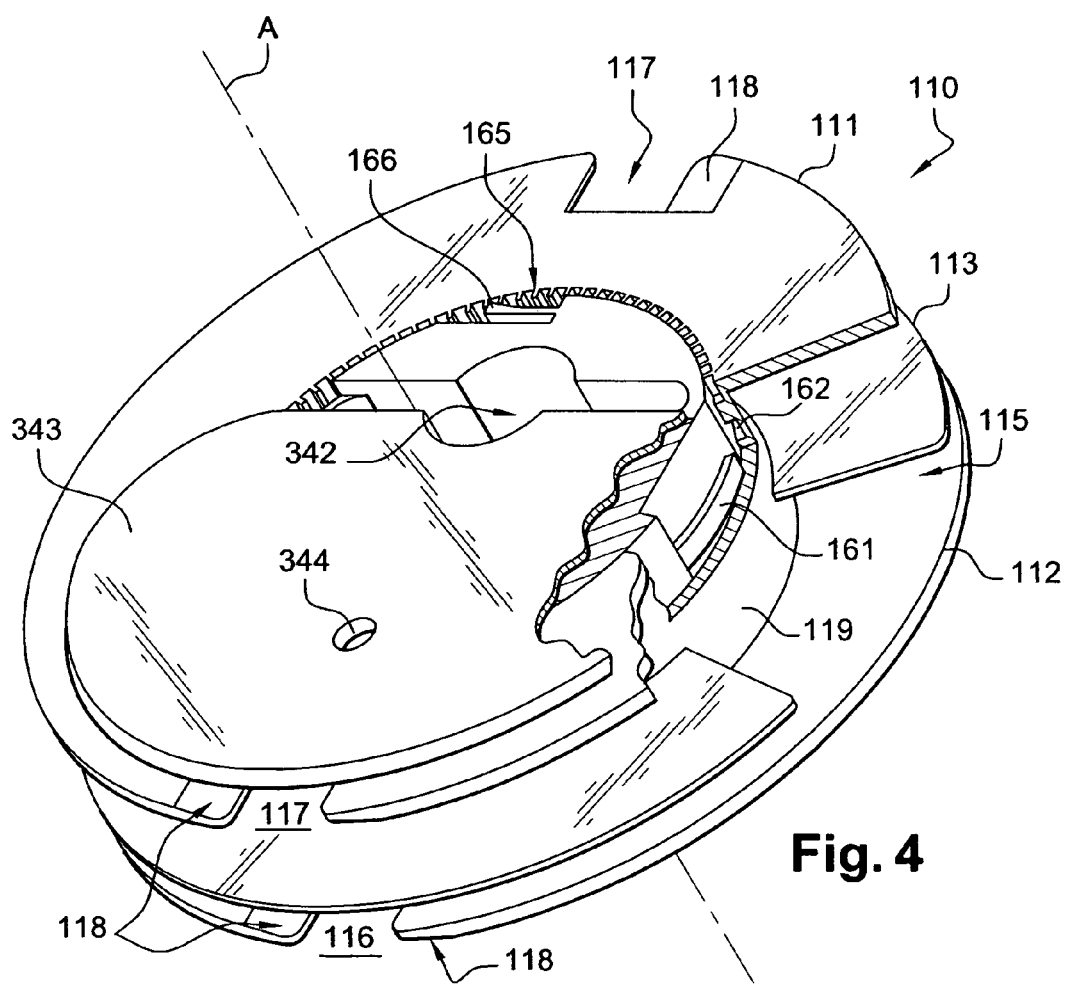
FIG. 4 is a part-sectional perspective view of a different embodiment of a spool of the FIG. 3A device.

In a variant shown in FIG. 4, the two mobile stowage areas are no longer interconnected by a screw; instead, they are both fixed to the spool 110 by means of an interleaving system. In this case, a groove 162 for each stowage area is formed on the inside wall of the drum 119 and is adapted to receive an elastic tongue 161 on the perimeter of the cylindrical support 341, 361 of each stowage area 340, 360 that is adapted to interengage in the groove 162 to hold each stowage area firmly in place.

In a variant also shown in FIG. 4, a ratchet system may be provided enabling each stowage area to rotate in one direction, in order to maintain the end of the stowed cable under light tension, and to prevent rotation in the opposite direction, with the attendant risk of causing kinking of the cable or removal thereof from the inclined wall 345.

To this end, notches 165 are provided on the perimeter of the inside wall of the drum 119 of the spool 110, with a pitch of 2 mm, for example. A pawl 166 fastened to the cylindrical support 341 engages in these notches 165, preventing the cylindrical support 341 from rotating in one direction, for example counter-clockwise in FIG. 4, but allowing it to rotate in the opposite direction, i.e. clockwise in FIG. 4, to draw in a surplus length of cable and to maintain it lightly tensioned. The pawl 166 is preferably elastic.

When a cylindrical support 341 is fitted into its housing, it is necessary to depress the elastic tongue(s) 161 and the elastic pawl 166 to retract them to allow the cylindrical support 341 to penetrate into the interior of the drum 119. The cylindrical support then penetrates into its housing, after which, when they are lined up facing the groove 162, the elastic tongues 161 relax and penetrate into the groove, thereby retaining the cylindrical support 341. The elastic pawl 166 also relaxes and takes up a position bearing against the inside of the notches 165.

Figure 5:
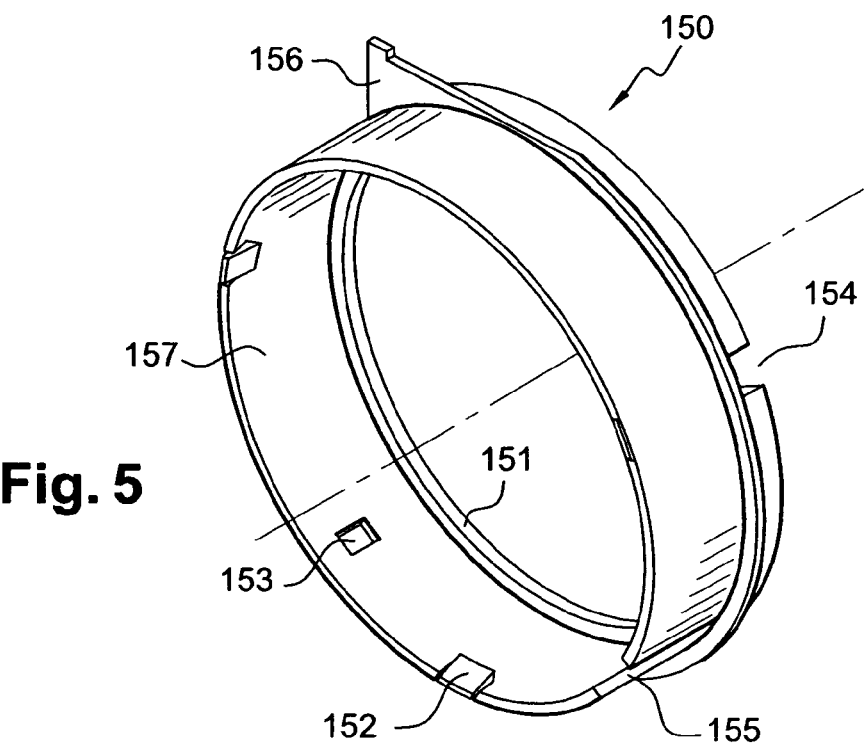
FIG. 5 is a perspective view of a casing of either embodiment of the device.

The lateral flanges of the spool 110 are of substantially circular shape and thus retain the spool when it rotates inside the casing 150, which is shown in detail in FIG. 5. The substantially cylindrical internal wall 157 guides the spool. Abutments are provided to retain the spool in its casing and may take various forms. FIG. 5 illustrates one example. On one side an abutment 151 consisting of an increased thickness all around the perimeter of the casing, for example, prevents the spool from escaping on this side by retaining one of the lateral flanges 111. Other lugs 152 on the other side of the casing retain the other lateral flange 112, for example. These lugs 152 may be elastic, for example, so that the spool can be withdrawn from its casing by flexing them.

The lugs 153 may instead be on the internal wall 157 of the casing so that they bear on the interior flange 113, instead of on the other side of the casing. In this case, sufficient lugs 153 are offset with respect to the opening 115 of the interior flange 113. This variant has the advantage of using a spool of the same thickness as the casing and thus of increasing the ratio of the stowage volume to the total volume of the packaging and unwinding device.

The lateral openings 154 and 155 have sections of the cable passed through them during installation operations.

A cover, not shown, nests over the external wall of the casing, for example, on the side opposite that protected by the support 200, to cover and protect the spool.

Figure 6:
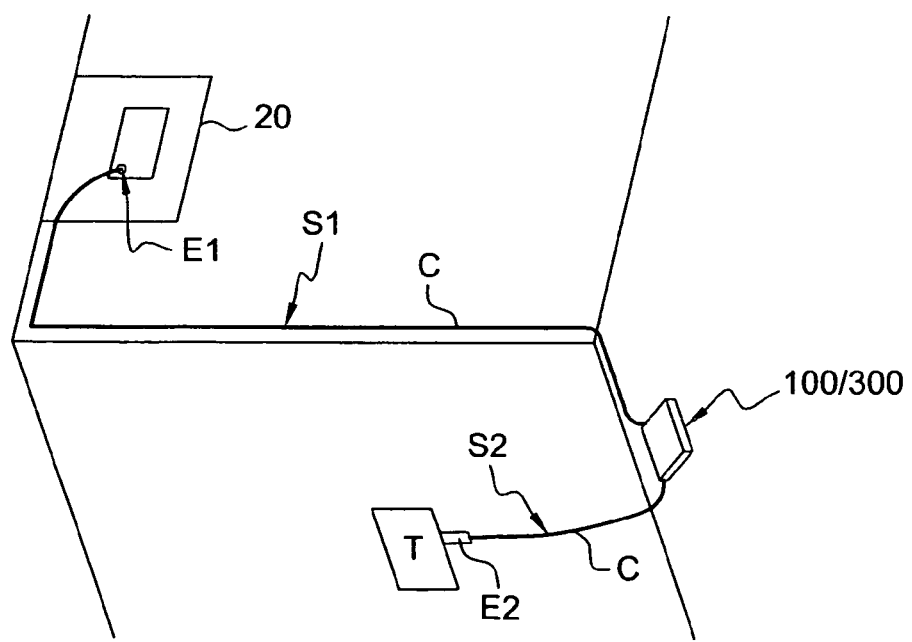
FIG. 6 is a diagram of a cable installation effected by means of either embodiment of the cable packaging and unwinding device.

FIG. 6 is a diagram of a cable installation using either embodiment of a cable packaging and unwinding device. A first step of connecting a terminal T situated in the home of a user to a connection box 20, for example, by means of an optical fiber cable C stowed in a cable packaging and unwinding device 100, 300, consists in extracting a first end E1 of the cable C from the device and connecting it to the connection box 20. A second step consists in unwinding the first section S1 of the cable C by rotating the spool 110 inside the casing, until it reaches a point in the vicinity of the terminal T to be connected. The next step consists in extracting the other end E2 of the cable by lining up a notch in one lateral flange with a corresponding opening in the casing. The second section S2 of the cable is then unwound by pulling lightly on the cable, until it reaches the terminal T, to which it is connected. The device may then be moved in order to fix it to a baseboard, for example; while the device is being moved, the cable section S1 is wound in, for example, whereas the cable section S2 is unwound.

The various embodiments and variants of the device that are described above are merely illustrative examples and the invention is in no manner limited to those examples. This device has the advantage of being compact and discreet. It enables several tens of meters of optical fiber cable to be stowed within a compact overall size, as it fits in the palm of the hand. It therefore facilitates the introduction of optical fiber cables into domestic installations.

The invention claimed is:

1. A cable packaging and unwinding device (100; 300) comprising a spool (110) in which are formed two winding areas (Z1, Z2) for two continuous sections (S1, S2) of a cable and at least one stowage area (130; 340, 360) for at least one end of one of the two cable sections, wherein the spool (110) takes the form of a drum (119) having two lateral flanges (111, 112) and an interior flange (113), said interior flange (113) defining the two winding areas (Z1, Z2) and including an opening (115) forming a passage for the cable between said two winding areas, and said two lateral flanges (111, 112) having a notch (116; 117) forming a passage for each cable section (S1, S2) from the stowage area (130; 340, 360) to the exterior of the spool (110), and in that the spool (110) is mounted to rotate about an axis (A) inside a substantially cylindrical casing (150) in which are formed openings (154, 155) forming a passage for each cable section (S1, S2).

2. A device according to claim 1, wherein a groove (120) is formed in the thickness of each lateral flange (111, 112) and in line with a notch (116; 117) to enable the end of a cable section to be retained in the stowage area (130) during rotation of the spool (110).

3. A device according to claim 1 wherein a recess (114) in the thickness of each lateral flange (111, 112) is adapted to receive a fitting serving as a handle for rotating the spool (110).

4. A device according to claim 1, wherein the stowage area (340, 360) comprises a cylindrical support (341, 361) in which there is formed a stowage cavity (342) and to which are fixed a guiding cam (343, 363) and retaining means (370, 166).

5. A device according to claim 4, wherein the guiding cam (343, 363) is rotatable about the axis (A) and entrains with it a cylindrical support (341, 361).

6. A device according to claim 5 wherein a recess (344) in the thickness of the guiding cam (343, 363) is adapted to receive a fitting serving as a handle for rotating the cam.

7. A device according to claim 5, wherein two stowage areas (340, 360) are disposed head-to-tail inside the drum (119) and the retaining means take the form of a screw (370) disposed along the rotation axis (A) and adapted, when tightened, to fasten the two stowage areas to the spool (110) and, when loosened, to allow the two stowage areas (340, 360) to rotate independently of each other.

8. A device according to claim 5, wherein the retaining means of each stowage area (340, 360) include at least an elastic tongue (161) fastened to the cylindrical support (341) adapted to interengage in a groove (162) on the internal wall of the drum (119).

9. A device according to claim 5, wherein a ratchet system comprising a pawl (166) fastened to the cylindrical support (341) and in bearing engagement with notches (165) on the internal wall of the drum (119) allows rotation of the stowage areas (340, 360) in one direction and prevents rotation thereof in the opposite direction.

10. A device according to claim 4 wherein the guiding cam (343, 363) has a thickness at least equal to the diameter of the cable and an inclined lateral wall that prevents the end of a cable section escaping from the stowage cavity (342).

11. A device according to claim 1, wherein the notches (116, 117) in the lateral flanges have inclined flats (118).

12. A device according to claim 1, wherein the substantially cylindrical casing (150) has on its internal wall (157) abutments (151, 152, 153) for retaining the spool (110) in its casing.

* * * * *